(12) United States Patent
Hicks

(10) Patent No.: US 8,157,701 B2
(45) Date of Patent: Apr. 17, 2012

(54) LIGHTWEIGHT GEARING

(75) Inventor: Raymond J. Hicks, Llangammarch (GB)

(73) Assignee: Orbital 2 Ltd., Powys (GB)

( * ) Notice: Subject to any disclaimer, the term of this patent is extended or adjusted under 35 U.S.C. 154(b) by 1122 days.

(21) Appl. No.: 10/573,195

(22) PCT Filed: Sep. 20, 2004

(86) PCT No.: PCT/GB2004/003993
§ 371 (c)(1),
(2), (4) Date: Feb. 26, 2008

(87) PCT Pub. No.: WO2005/028916
PCT Pub. Date: Mar. 31, 2005

(65) Prior Publication Data
US 2008/0207388 A1    Aug. 28, 2008

(30) Foreign Application Priority Data

Sep. 22, 2003  (GB) .................................. 0322120.7

(51) Int. Cl.
*F16H 3/62* (2006.01)

(52) U.S. Cl. ........................................................ 475/330
(58) Field of Classification Search .................. 475/329, 475/330
See application file for complete search history.

(56) References Cited

U.S. PATENT DOCUMENTS

| 6,723,019 B2 * | 4/2004 | Lee et al. ...................... 475/276 |
| 6,729,993 B2 * | 5/2004 | Bucknor et al. .............. 475/275 |
| 2003/0162629 A1 * | 8/2003 | Bucknor et al. .............. 475/330 |

FOREIGN PATENT DOCUMENTS

WO    WO 01/50038    7/2001

* cited by examiner

*Primary Examiner* — Edwin A Young
(74) *Attorney, Agent, or Firm* — King & Schickli, PLLC

(57) ABSTRACT

A high ratio epicyclic gear assembly comprising two high torque planetary trains through which power flows via two parallel paths in one or other of which is an intermediate star train (7) with a low torque differential train or gear which transmits the combined power in such a way that the high torque planetary trains share the total torque in a predetermined ratio.

17 Claims, 2 Drawing Sheets

Ratio 35:1

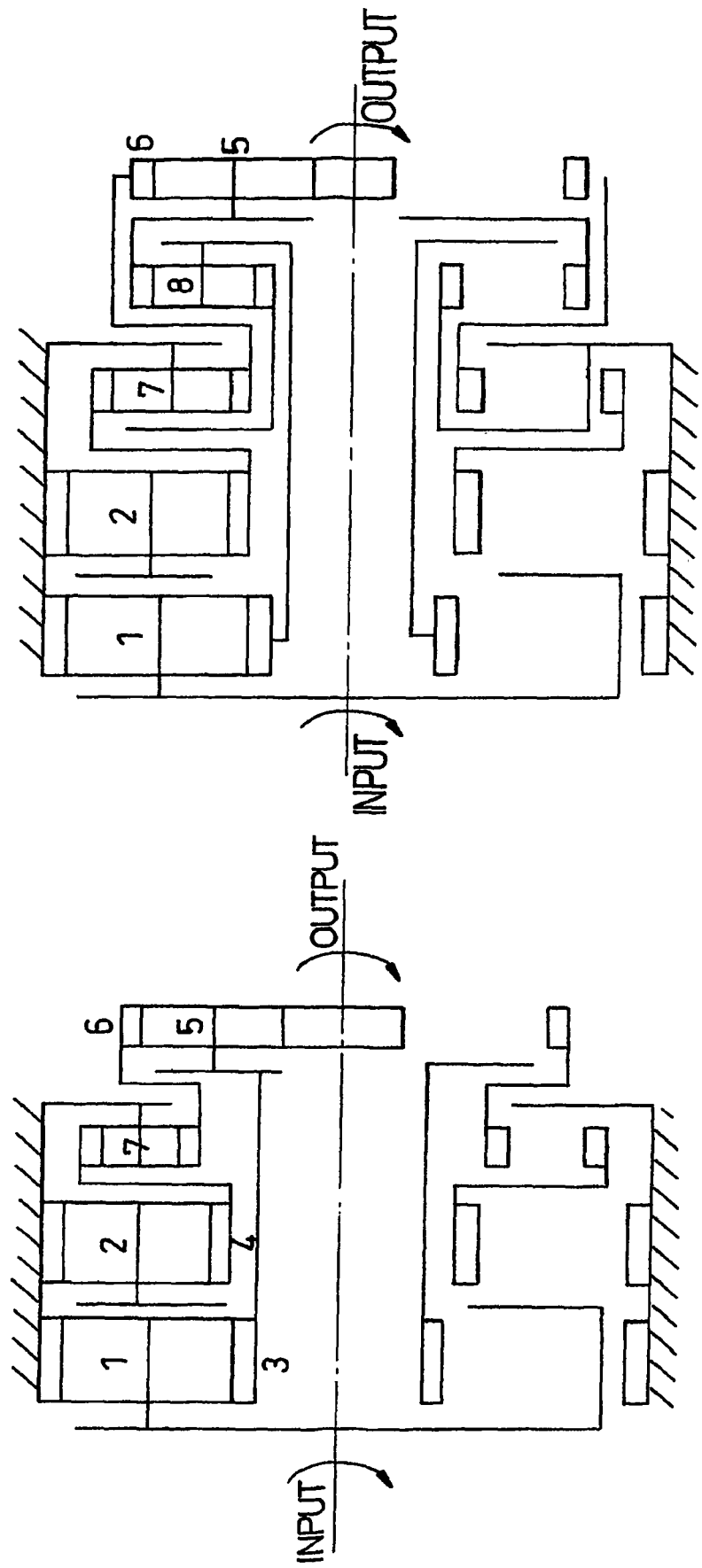
Fig. 1 Ratio 35:1
Fig. 2 Ratio 70:1

*Fig. 3* Ratio 126:1

LIGHTWEIGHT GEARING

FIELD OF THE INVENTION

The present invention provides a high ratio epicyclic gear assembly with high efficiency and minimum volume and weight. While it may be used either for speed reducing or increasing applications, it is particularly suited for the latter, especially for wind turbo-generator drives in which torque and overall speed step-up ratio increase with power causing disproportionate increases in gearbox weight; e.g. a 3000 kW turbine runs at 35% of the speed and has 22.6 times the torque of a 375 kW machine. This means that an eight fold increase in power increases the weight of the associated gearbox by a factor of over 22.6. This invention enables a gearbox not only to be less than half the weight of a conventional gearbox, but also to have lower gear tooth stresses, longer life bearings and higher overall efficiency.

BACKGROUND OF THE INVENTION

Since gear box manufacturing costs are primarily governed by weight and since this in turn influences nacelle and tower weights, then significant savings can be made in a complete installation.

This invention therefore, exploits the fact that an epicyclic gear with a low basic annulus to sun ratio can accommodate a greater number of planet wheels than a gear with a high ratio. Furthermore, the lower the ratio, the more efficient the gear becomes when used in a planetary configuration with a stationary annulus because the lower relative speed of the sunwheel with respect to the planet carrier, ensures that a greater proportion of the throughput power is transmitted by a direct coupling effect. Since a planet carrier has a torque equal numerically to the sum of the sun and annulus torques, then to minimise volume, it should always be used as the high torque member in a transmission. However, to realise the full benefit of using more than three planets it is essential to have an effective means of sharing the load equally between them e.g. the flexible pin planet spindle which enables the maximum number to be used subject only to the clearance between adjacent planet tip diameters. The key feature of this invention is that total input torque is arbitrarily divided between two low ratio primary planetary trains that transmit power along two parallel paths. These low ratios stem from the use of a secondary differential train to re-combine the separated power flows into a single output. The resultant overall speed increasing ratio is effectively doubled and for a given output speed, the primary ratios can be halved. This enables more planets to be used so that there is a significant reduction in collective weight and component sizes.

SUMMARY OF THE INVENTION

According to one aspect of the invention there is provided a high ratio epicyclic gear assembly comprising two high torque planetary trains through which power flows via two parallel paths in one or other of which is an intermediate star train with a low torque differential train or gear which transmits the combined power in such a way that the high torque planetary trains share the total torque in a pre-determined ratio.

In a preferred embodiment the high torque planetary trains share the total torque equally. The high torque trains may have the same or different ratios. The differential gear or train may be in the form of a planetary train. The high torque trains may have six and eight planets respectively and the star and differential train may have twelve and five planets respectively.

The assembly may include an additional intermediate solar train in which the power path does not have the intermediate star train and the intermediate solar train may itself be replaced by a planetary train.

From another aspect the invention includes an epicyclic inversion of any one of the same assemblies of the preceding claims including a gear case which is a rotating transmission member and in which the carriers of the high torque planet trains serve as the stationary reaction.

Although the invention has been defined above it is to be understood it includes any inventive combination of the features set out above or in the following description.

BRIEF DESCRIPTION OF THE DRAWINGS

The invention may be performed in various ways and specific embodiments will now be described with reference to the accompanying drawings in which:

FIG. 1 is a schematic view of a high ratio epicyclic gear assembly with a ratio of 35:1;

FIG. 2 is a schematic view of such an assembly with a ratio of 70:1;

FIG. 3 is a schematic view of a further embodiment having a 120:1 ratio.

DETAILED DESCRIPTION OF THE INVENTION

Figure 4:
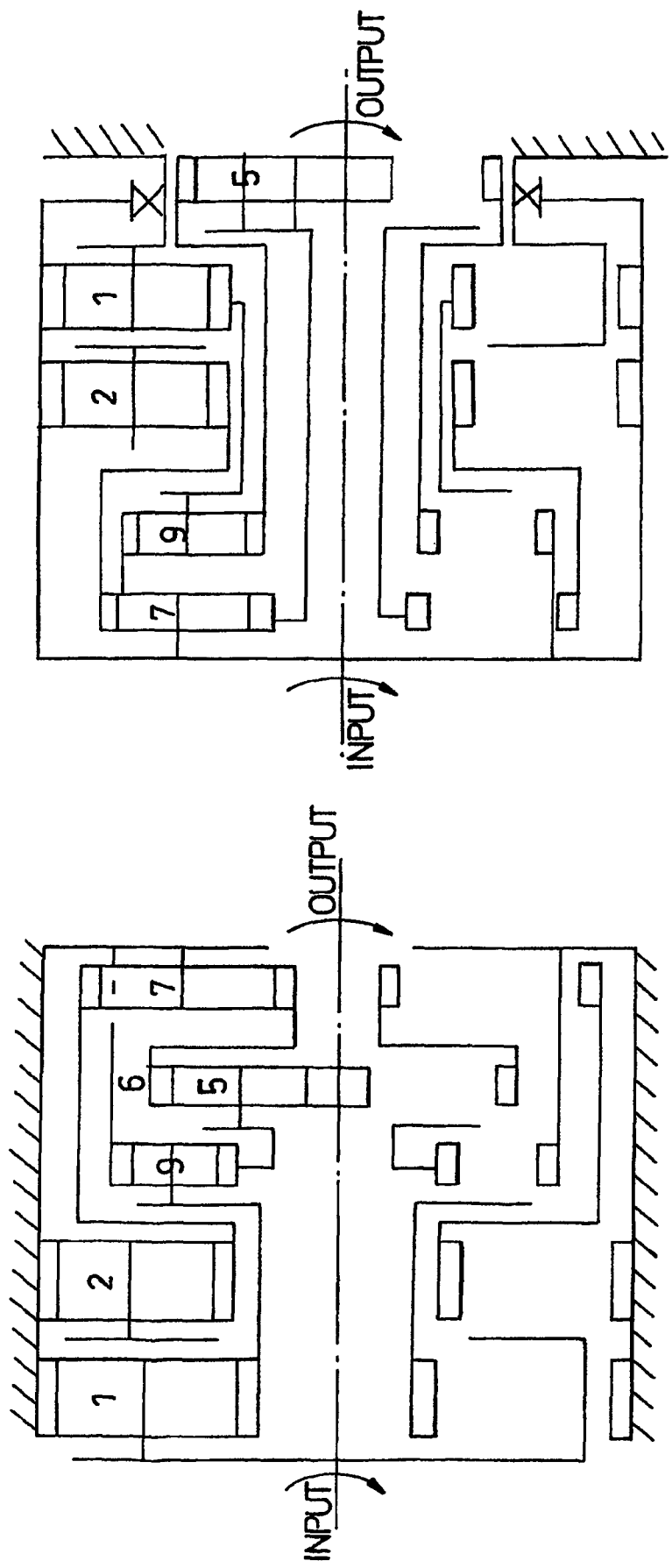
FIG. 4 is a schematic view of the epicyclic inversion of the design principles set out in the previous figures.

According to one embodiment of this invention, as shown in FIG. 1, the input power and torque of a speed increasing gear are divided between the planet carriers 1 and 2 of two planetary trains with power flowing from their respective sunwheels 3 and 4. The first sunwheel drives the planet carrier 5 of a differential train while the second sunwheel drives the differential annulus 6 via an intermediate star train 7 at a speed and sense of rotation necessary to precisely determine the required balance of powers in the respective primary trains irrespective of relative torsional deflection between the inputs to the two planet carriers.

While it is quite feasible to have the same annulus to sun ratios of 2.8 in the two primary planetary trains and corresponding ratios of 1.62 in the intermediate star and differential trains to give an overall speed increasing ratio 20/1, a larger overall ratio may be obtained if the second primary train ratio is somewhat less than the first as this enables the ratio of the low torque differential train to be increased e.g. respective annulus to sun ratios of 2.8 and 2.15 in the two high torque primary and 1.54 and 3.6 in the low torque intermediate and differential trains give an overall ratio of 35/1. With such ratios, flexible planet spindles enable 6 and 8 planets to be accommodated in the primary trains with 12 and 5 in the intermediate and differential trains.

Notwithstanding the four trains in this arrangement, the split power paths and low ratios with multiple planets having small diameters, ensure that relative pitch line velocities, tooth loads and the overall associated losses are lower than those in a conventional two stage gear having the same overall ratio.

As shown in FIG. 2, by introducing an intermediate solar train 8 i.e. (with a stationary sunwheel reaction member) into the first power path to the differential planet carrier and increasing the ratio of the intermediate star in the second path to the differential annulus, the differential annulus to sun ratio can be increased to 5.1 (with 4 planets) to give an overall ratio of 70/1. Since this can be done without changing the primary high torque planetary ratios, there is a relatively minor increase in weight due mainly to the additional low torque solar train.

FIG. 3 shows that overall ratio can be increased even further to 120/1, again without significant increase in weight, by changing from a solar to a planetary intermediate train 9 in the first path and increasing the intermediate star ratio in the second path but leaving the primary and differential ratios the same as FIG. 2.

FIG. 4 shows an epicyclic inversion of the principle in which the casing is a rotating power transmitting member while the high torque primary planet carriers become the stationary reaction member.

In all four configurations the input and output members can be arranged to rotate in either the same or opposite senses by alternatively coupling the outputs from the intermediate star, solar or planetary trains, as appropriate, to the annulus or planet carrier of the differential train.

While minimising the volume/weight by using low basic ratios in the high torque primary trains, variation of the intermediate and differential train ratios can effect sufficient increases in overall ratio to ensure that there is no need for more than five trains for any currently envisaged wind turbine powers and speeds. Although, superficially, a five train assembly may appear complex, it is in effect a three stage gear having a two path two stage fixed ratio section and a final differential stage to determine the balance of powers in the respective paths. However, it is feasible to further divide the transmission into three or more parallel power paths with a double or multiple differential integrating arrangement.

In particular, for wind turbine applications, the choice of overall ratio, the number of trains and their configuration is governed by the coupling and mounting requirements of the installation architecture e.g. whether or not an offset output shaft is required. It is also dependent on the embodiment of additional torque limiting and/or variable ratio mechanisms. To minimise volume and weight, these are preferably located at the high speed/low torque output stage, before the final drive to the generator.

The invention claimed is:

1. An epicyclic gear assembly comprising two planetary trains, each for carrying a portion of an input torque, through which power flows via two parallel paths, in one of which is an intermediate star train with a differential train or gear for carrying a torque which is lower than the input torque, said differential train or gear which transmits a combined power from the paths in such a way that the two planetary trains share the input torque in a pre-determined ratio.

2. An assembly as in claim 1, in which the two planetary trains share the input torque equally.

3. An assembly as in claim 2 wherein the two planetary trains have the same or different ratios.

4. An assembly as claimed in claim 3 wherein the differential train is a planetary train.

5. An assembly as in claim 4, wherein the two planetary trains have 6 and 8 planets respectively and the intermediate and differential trains have 12 and 5 planets respectively.

6. An epicyclic inversion of the gear assembly as claimed in claim 5, further including a gear case, wherein the gear case is a rotating transmission member and planet carriers of the two planetary trains serve as the a stationary reaction.

7. An epicyclic inversion of the gear assembly as claimed in claim 4, further including a gear case, wherein the gear case is a rotating transmission member and planet carriers of the two planetary trains serve as a stationary reaction.

8. An assembly as in claim 3 including an additional intermediate solar train in whichever power path does not have the intermediate star train.

9. An assembly as in claim 8 wherein the intermediate solar train is replaced by a planetary train.

10. An epicyclic inversion the gear assembly as claimed in claim 9, further including a gear case, wherein the gear case is a rotating transmission member and planet carriers of the two planetary trains serve as a stationary reaction.

11. An epicyclic inversion the gear assembly as claimed in claim 8, further including a gear case, wherein the gear case is a rotating transmission member and planet carriers of the two planetary trains serve as a stationary reaction.

12. An epicyclic inversion of the gear assembly as claimed in claim 3, further including a gear case, wherein the gear case is a rotating transmission member and planet carriers of the two planetary trains serve as a stationary reaction.

13. An assembly as claimed in claim 2, wherein the differential train is a planetary train.

14. An epicyclic inversion of the gear assembly as claimed in claim 2, further including a gear case, wherein the gear case is a rotating transmission member and planet carriers of the two planetary trains serve as a stationary reaction.

15. An epicyclic inversion of the gear assembly as claimed in claim 1, further including a gear case, wherein the gear case is a rotating transmission member and the planet carriers of the two planetary trains serve as a stationary reaction.

16. An assembly as in claim 1, wherein the two planetary trains have the same or different ratios.

17. An assembly as claimed in claim 1, wherein the differential train is a planetary train.

\* \* \* \* \*